United States Patent
Regunathan et al.

(10) Patent No.: US 11,711,137 B2
(45) Date of Patent: Jul. 25, 2023

(54) SATELLITE BEAM DETERMINATION (71) Applicant: Hughes Network Systems, LLC, Germantown, MD (US)

(72) Inventors: Murali Regunathan, Germantown, MD (US); David A. Roos, Boyds, MD (US)

(73) Assignee: Hughes Network Systems LLC, Germantown, MD (US)

( * ) Notice: Subject to any disclaimer, the term of this patent is extended or adjusted under 35 U.S.C. 154(b) by 343 days.

(21) Appl. No.: 16/728,260

(22) Filed: Dec. 27, 2019

(65) Prior Publication Data

US 2021/0203409 A1 Jul. 1, 2021

(51) Int. Cl.
*H04B 7/185* (2006.01)
*H04B 7/204* (2006.01)

(52) U.S. Cl.
CPC ....... *H04B 7/18513* (2013.01); *H04B 7/2041* (2013.01)

(58) Field of Classification Search
CPC .......... H04B 7/18513; H04B 7/2041; H04B 7/1852; H04W 48/20
USPC ....................................................... 455/12.1
See application file for complete search history.

(56) References Cited

U.S. PATENT DOCUMENTS

| | | | | |
|---|---|---|---|---|
| 6,421,526 | B1* | 7/2002 | Banno | H01Q 21/28 455/12.1 |
| 2003/0141409 | A1* | 7/2003 | Lisoski | B64D 27/24 244/13 |
| 2005/0090217 | A1* | 4/2005 | Zhu | H04W 16/18 455/242.1 |
| 2005/0260947 | A1* | 11/2005 | Karabinis | H04B 7/18515 455/12.1 |
| 2013/0109376 | A1* | 5/2013 | Roos | H04B 7/2041 455/427 |
| 2013/0232564 | A1* | 9/2013 | Ellis | G06F 11/2043 726/11 |
| 2013/0232565 | A1 | 9/2013 | O'Connor | |
| 2015/0229385 | A1* | 8/2015 | Roos | H04B 7/18508 370/317 |
| 2016/0006500 | A1* | 1/2016 | Radpour | H04B 7/18539 455/427 |

(Continued)

FOREIGN PATENT DOCUMENTS

| | | |
|---|---|---|
| EP | 0663736 A1 | 7/1995 |
| EP | 2947789 A1 | 11/2015 |
| WO | 2016/036290 A1 | 3/2016 |

OTHER PUBLICATIONS

International Search Report and Written Opinion for PCT/US2020/0632229 dated Apr. 7, 2021 (12 pages).

*Primary Examiner* — April G Gonzales
(74) *Attorney, Agent, or Firm* — Bejin Bieneman PLC (57) ABSTRACT

A user terminal and a method of using the user terminal disclosed. The method may comprise: storing, at a user terminal (UT), a dataset that comprises a plurality of elements, wherein each of the plurality of elements is associated with a unique predetermined terrestrial location; using the dataset, determining an element ($E_k$) from among the plurality of elements based on a proximity of the UT to the respective unique, predetermined terrestrial location of the element ($E_k$); and then determining one of the plurality of satellite beams with which to utilize satellite communication.

19 Claims, 6 Drawing Sheets

(56) References Cited

U.S. PATENT DOCUMENTS

| | | | |
|---|---|---|---|
| 2017/0180038 A1* | 6/2017 | Oza | H04B 7/18513 |
| 2023/0118341 A1* | 4/2023 | Erramilli | G06N 20/00 |
| | | | 706/12 |
| 2023/0127955 A1* | 4/2023 | Morrar | H04B 17/14 |
| | | | 455/12.1 |

* cited by examiner

SATELLITE BEAM DETERMINATION

BACKGROUND

In satellite systems, a base station may instruct a user terminal to connect. For example, the base station may determine a satellite beam with which the user terminal should communicate. Thereafter, the base station—via a satellite—may send an instruction to the user terminal instructing it to connect using the determined beam. Determining—at the base station—which beam should be used by the user terminal may be suitable when beam shapes are circular.

DETAILED DESCRIPTION

A satellite communication system is disclosed. Multibeam satellite systems may have one or more base stations, a plurality of beams, and a plurality of terminals distributed among the beams. Each terminal may gain access to the satellite by using its latitude and longitude and having a set of information defining which beam the terminal's latitude and longitude is in. In some cases, the terminal's location could reside in more than one beam. The base station may determine which beam the terminal should use and instruct it to access the satellite using the appropriate beam. Both terminal and base station need to know which beam the terminal is assigned to so that they may communicated via the satellite. According to an example, the satellite communication system may comprise a user terminal. Methods of using the user terminal are disclosed herein. According to one non-limiting example, a method of determining one of a plurality of satellite beams is disclosed. The method may comprise: storing, at a user terminal (UT), a dataset that comprises a plurality of elements, wherein each of the plurality of elements is associated with a unique predetermined terrestrial location; using the dataset, determining an element ($E_k$) from among the plurality of elements based on a proximity of the UT to the respective unique, predetermined terrestrial location of the element ($E_k$); and then determining one of the plurality of satellite beams with which to utilize satellite communication.

According to the method example set forth above and/or according to any of the other examples set forth above, each of the plurality of elements comprises: an element index, location identifiers of a respective unique and predetermined terrestrial location relative to a satellite, and one or more tuples, wherein each of the one or more tuples comprise: a beam identifier associated with one of the plurality of satellite beams and at least one of a signal quality parameter (SQF) or an availability parameter (Avail) of the respective one of the plurality of satellite beams.

According to the method example set forth above and/or according to any of the other examples set forth above, determining the one of the plurality of satellite beams further comprises using the corresponding one or more tuples of the element ($E_k$).

According to the method example set forth above and/or according to any of the other examples set forth above, using the dataset comprises using the respective location identifiers of the plurality of elements to determine the element ($E_k$).

According to another non-limiting example, a method of determining one of a plurality of satellite beams is disclosed. The method may comprise: storing, at a user terminal (UT), a dataset that comprises a plurality of elements, wherein each of the plurality of elements is associated with a unique predetermined terrestrial location, wherein each of the plurality of elements comprises: an element index, location identifiers of a respective unique and predetermined terrestrial location relative to a first satellite, and one or more tuples, wherein each of the one or more tuples comprise: a beam identifier associated with one of the plurality of satellite beams and at least one of a signal quality parameter (SQF) or an availability parameter (Avail) of the respective one of the plurality of satellite beams; using the respective location identifiers of the plurality of elements, determining an element ($E_k$) from among the plurality of elements based on a proximity of the UT to the respective unique, predetermined terrestrial location of the element ($E_k$); and using the corresponding one or more tuples of the element ($E_k$), determining one of the plurality of satellite beams with which to utilize satellite communication.

According to the method example set forth above and/or according to any of the other examples set forth above, further comprising establishing a satellite connection with the determined one of the plurality of satellite beams.

According to the method example set forth above and/or according to any of the other examples set forth above, for each of the plurality of elements, the respective location identifiers comprise a first location parameter and a second location parameter, wherein—for each respective element—the corresponding first and second location parameters define a unique predetermined terrestrial location relative to a celestial position of the first satellite.

According to the method example set forth above and/or according to any of the other examples set forth above, at least some of the one or more tuples comprise both the signal quality parameter and the availability parameter.

According to the method example set forth above and/or according to any of the other examples set forth above, at least some of the one or more tuples further comprise at least one hardware parameter, wherein the at least one hardware parameter is used to determine the one of the plurality of satellite beams with which to utilize satellite communication.

According to the method example set forth above and/or according to any of the other examples set forth above, at least one hardware parameter comprises an antenna size parameter and a signal power parameter for the UT to establish and utilize satellite communication.

According to the method example set forth above and/or according to any of the other examples set forth above, at least some of the plurality of elements comprises multiple tuples.

According to the method example set forth above and/or according to any of the other examples set forth above, the respective location identifiers of at least some of the plurality of elements are indicia of a first boundary of a first footprint of the first satellite beam, and wherein the respective location identifiers of at least some other of the plurality of elements are indicia of a second boundary of a second footprint of a second satellite beam.

According to the method example set forth above and/or according to any of the other examples set forth above, the respective location identifiers of at least some of the plurality of elements are located outside of the first and second boundaries.

According to the method example set forth above and/or according to any of the other examples set forth above, when the location identifiers of the respective element are located outside of the first and second boundaries, then the beam identifier of the respective element is a negative value, the signal quality parameter being less than a first predetermined threshold, the availability parameter being less than a second predetermined threshold, or a combination thereof.

According to the method example set forth above and/or according to any of the other examples set forth above, the first boundary, the second boundary, or both have an irregular shape, wherein irregular shape refers a noncircular, nonelliptical, or nonregular shape, wherein irregular shape refers to an asymmetrical area having at least one portion of a perimeter that does not mirror another region of the perimeter and that is not uniform with respect to any other portion of the perimeter.

According to the method example set forth above and/or according to any of the other examples set forth above, the respective location identifiers of the plurality of elements define a grid of equidistantly-spaced locations within the first satellite beam.

According to the method example set forth above and/or according to any of the other examples set forth above, determining the element ($E_k$) using the respective location identifiers further comprises: determining a latitude value and a longitude value of the UT; converting the latitude and longitude values of the UT into an azimuth value and an elevation value that correspond with a celestial position of the first satellite; and calculating a distance value using the azimuth and elevation values (of the UT) and the location identifiers of the element ($E_k$).

According to the method example set forth above and/or according to any of the other examples set forth above, determining the relative position comprises: calculating a plurality of distance values between the UT and at least some of the plurality of evaluation points; and then, determining which of the plurality of distance values is a minimum.

According to the method example set forth above and/or according to any of the other examples set forth above, determining the element ($E_k$) using the respective location identifiers further comprises: determining a latitude value and a longitude value of the UT; converting the latitude and longitude values of the UT into an azimuth value and an elevation value that correspond with a celestial position of the first satellite; rounding the azimuth and elevation values according to a predetermined resolution; and then comparing the rounded azimuth and elevation values to each of the respective location identifiers of the plurality of elements.

According to another non-limiting example, a computer is disclosed that comprises one or more processors; and memory communicatively coupled to the one or more processors, wherein the memory stores instructions executable by the one or more processors, wherein the instructions comprise to: store a dataset that comprises a plurality of elements, wherein each of the plurality of elements is associated with a unique predetermined terrestrial location; using the dataset, determine an element ($E_k$) from among the plurality of elements based on a proximity of the UT to the respective unique, predetermined terrestrial location of the element ($E_k$); and then select one of the plurality of satellite beams with which to utilize satellite communication, wherein the computer is a user terminal, a satellite base station, or a land-based server.

According to the at least one example set forth above, a computing device comprising at least one processor and memory is disclosed that is programmed to execute any combination of the examples of the method(s) set forth above.

According to the at least one example, a computer program product is disclosed that includes a computer readable medium that stores instructions which are executable by a computer processor, wherein the instructions of the computer program product include any combination of the examples of the method(s) set forth above and/or any combination of the instructions executable by the one or more processors, as set forth above and herein.

Modern satellite systems may concentrate signal strength in some geographic regions more than others. For example, it may be desirable to narrow a width of a satellite beam (e.g., or simply a 'beam' herein) in urban areas or in geographic areas having higher throughput demands (e.g., a higher concentration of customers). Further, it may be desirable to alter signal strength concentrations from time-to-time in order to balance traffic loads. Concentrating or otherwise varying these beam characteristics can yield satellite beams having irregular shapes. For example, a typical shape of a beam may be circular or elliptical; however, an irregularly-shaped satellite beam may be noncircular, non-elliptical, or nonregular shape. In at least one example, an irregular shape may be defined as an asymmetrical area having at least one portion of a perimeter that does not mirror another region of the perimeter and that is not uniform with respect to any other portion of the perimeter. Changing the beam characteristics (and consequently the shape of the beam) presents challenges with regard to connecting user terminals. Below, a system is described which enables the user terminal to make the selection.

With reference to the figures, wherein like numerals indicate like parts throughout the several views, a satellite communication system 10 is described that permits a user terminal (UT) 12 to determine and select one of a plurality of satellite beams (or simply 'beams') with which to connect and use. The proposed system utilizes a plurality of user terminals that are each programmed with beam selection instructions (only one UT 12 is shown for purposes of illustration). These instructions include storing and using a beam selection dataset comprising a plurality of elements— each element being associated with one of a plurality of unique predetermined terrestrial locations. The UT 12 may be programmed to determine which, if any, of the unique predetermined terrestrial locations it is nearest. And based on this determination and other factors, the UT 12 may select a beam for connection.

Figure 1:
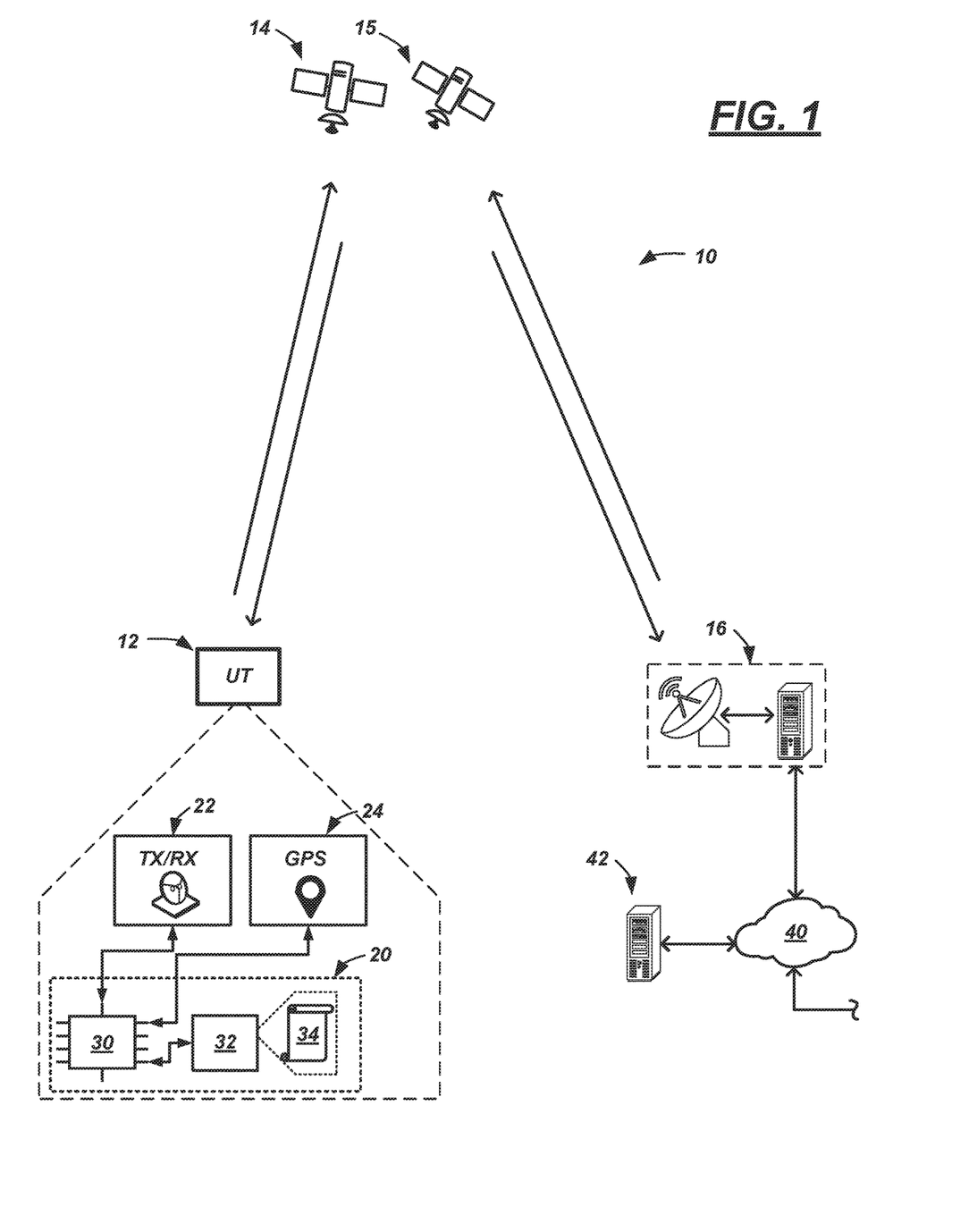
FIG. 1 is a schematic diagram of an example of a satellite communication system.

Satellite communication system 10 first will be described; after which, a process of an example UT 12 using the system 10 to select a beam will be described in detail. System 10 may comprise a plurality of UTs 12 (only one is shown), one or more satellites 14, 15 (only two are shown), and one or more satellite base stations 16 (only one is shown).

User terminal (UT) 12 may comprise, among other things, a computer 20, a transceiver 22 that facilitates satellite communication (e.g., satellite uplinks and satellite downlinks), and a global positioning system (GPS) device (or equivalent) 24 that provides the device's current latitude and longitude. Non-limiting examples of satellite terminals include a fixed satellite communication device (e.g., for home or business use), a mobile satellite device or portable computer with satellite capabilities, and the like.

Computer 20 may be any suitable electronics device which is communicatively coupled to transceiver 22 and is programmed or configured to carry out the process(es) described below. Computer 20 may comprise one or more processors 30 (only one is shown in the diagram for purposes of illustration), memory 32, and a plurality of instructions 34 (by way of example only, software code) which is stored on memory 32 and which is executable by processor(s) 30. Processor(s) 30 may be programmed to process and/or execute digital instructions to carry out at least some of the tasks described herein. Non-limiting examples of processor(s) 30 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 30 read from memory 32 and execute multiple sets of instructions (e.g., including instructions 34) which may be embodied as a computer program product stored on a non-transitory computer-readable storage medium (e.g., such as memory 32). Non-limiting examples of instructions 34 will be described below in the processes illustrated using flow diagrams and described elsewhere herein, wherein these and other instructions may be executed in any suitable sequence unless otherwise stated. The instructions and the example processes described below (and, e.g., shown in FIGS. 4, 5, and 7) are merely embodiments and are not intended to be limiting.

Memory 32 may include any non-transitory computer usable or readable medium, which may include one or more storage devices or storage articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 32 may store one or more sets of instructions (e.g., such as instructions 34) which may be embodied as software, firmware, or other programming instructions executable by the processor(s) 30—including but not limited to the instruction examples set forth herein. In operation, processor(s) 30 may read data from and/or write data to memory 32.

While not explicitly illustrated, transceiver 22 may comprise electronic circuitry, a dedicated microprocessor, one or more satellite communication chipsets enabling two-way communication, one or more antennas matched to a predetermined set of frequencies, and the like. Accordingly, transceiver 22 may receive an instruction from computer 20 and in response to the command, uplink information to the satellite 14 or 15 which in turn relays the information to base station 16. Similarly, transceiver 22 may receive downlink information and provide it to processor(s) 30, which in turn may store some of this information in memory 32 and/or act on the downlink information.

GPS device 24 may be any suitable electronic device that includes a receiver and computing device configured to receive information from a global positioning satellite—e.g., typically, a pair of coordinates (e.g., a latitude parameter and a longitude parameter) that correspond to a physical location of the device 24 on Earth's surface. GPS device 24 may utilize the Global Navigation Satellite System (GNSS placed into orbit by the U.S. Department of Defense), the Global Navigation Satellite System (GLONASS) (placed into orbit by Russia), or the like. Techniques for acquiring latitude and longitude from the GPS device 24 are generally known in the art.

Satellite(s) 14, 15 may be any suitable satellite communication equipment located in earth's orbit—non-limiting examples include: global-positioning satellites, observation satellites, communications satellites, navigation satellites, weather satellites, space telescopes, etc. Non-limiting examples of earth orbits include: geocentric orbits, heliocentric orbits, areocentric orbits, low earth orbits (LEO), medium earth orbits (MEO), geosynchronous orbits (GEO), high earth orbits (HEO), etc. Other orbits or orbit classifications also exist and are known to skilled artisans. Satellite(s) 14, 15 may communicate with the UT 12 via a so-called service link via any suitable frequency.

Figure 2:
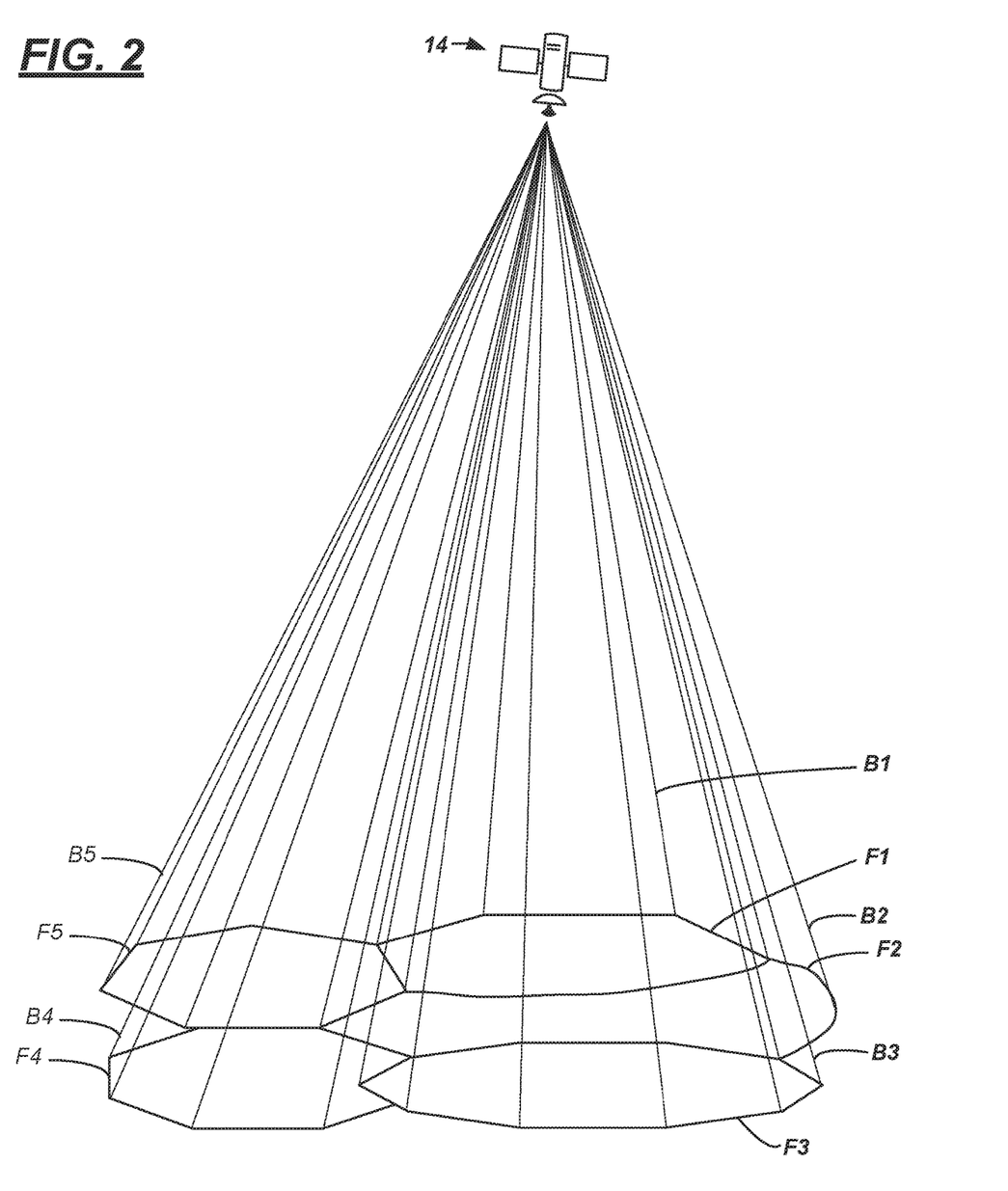
FIG. 2 is a diagram illustrating satellite operation with a plurality of beams and corresponding footprints.
Figure 3:
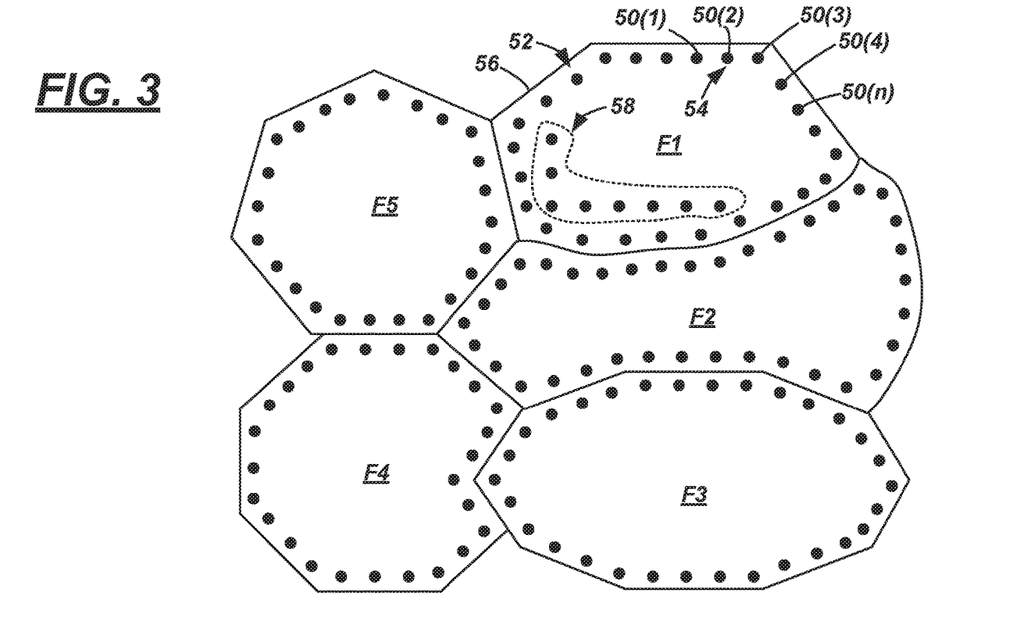
FIG. 3 is a diagram illustrating a satellite view of the footprints shown in FIG. 2 and further illustrating that unique sets of predetermined terrestrial locations may correspond with and/or define each footprint.

To illustrate a non-limiting example, FIG. 2 illustrates a plurality of beams B1, B2, B3, B4, B5 diverging from satellite 14 (see also FIG. 3 which illustrates a satellite-view of the same beam shapes on a portion of the Earth's surface). While not required, at least some of the beams B1-B5 have an irregular shape. FIG. 2 also illustrates that for each beam (B1, B2, B3, B4, B5) there is a corresponding beam footprint F1, F2, F3, F4, F5, wherein each footprint may be an area on the Earth's surface, wherein each footprint is an intersection of a longitudinally extending three-dimensional beam with the Earth's surface. Accordingly, the shape of a beam defines the shape of its footprint. (While not shown, it should be appreciated that satellite 15 may have similar beams, at least some of which may be irregularly-shaped as well, etc.)

FIG. 3 also illustrates sets of unique predetermined terrestrial locations 50(1), 50(2), 50(3), 50(4), 50(*n*) (by way of example, a few are labeled). For example, footprint F1 comprises a set 52 of n unique predetermined terrestrial locations. Among set 52, an example subset 54 of twenty-five terrestrial locations define a perimeter 56 (also called a boundary) of the respective footprint (e.g., F1)). A secondary subset 58 (here comprising eight unique predetermined terrestrial locations within footprint F1) is also shown which may be used to tailor a boundary of a neighboring footprint (e.g., the beam may have subtle variations in performance near the edges of a beam. Adding more points enables the boundary of the beam to have "holes" wherein the optimum beam may be subtly chosen, even within the nominal boundary of that beam). The other footprints F2-F5 each may have any suitable quantity of unique predetermined terrestrial locations, which may define the respective perimeters, a neighboring footprint, or both.

Returning to FIG. 1, satellite base station 16 includes terrestrial hardware that comprises one or more antennas, transceivers electronics, computing devices, and one or more network controllers configured for satellite communication. For example, base station 16 may comprise any computing device having processor(s) and memory that store instructions executable by the processor(s). As explained below, these instructions may include any of the processes described herein. Configuration of and techniques for utilizing the satellite base station 16 are generally known and will not be explained in greater detail herein. Typically, the base station 16 is communicatively coupled to a core network 40.

The core network 40 includes any suitable elements in a telecommunications network. For example, this may include Serving General Packet Radio Services (GPRS) Support Nodes (SGSNs), Gateway GPRS Support Nodes (GGSNs), Home Location Registers (HLRs), Authentication Centers (AuCs), and the like. The core network further may include any suitable components of 1G-5G cellular networks, etc. networks and interface components therebetween as well—all of which are known to skilled artisans. Further, other computers (e.g., such as a land-based server 42) may be communicatively coupled to the core network 40. Server 42 may be any computing device having processor(s) and memory that store instructions executable by the processor(s). As explained below, these instructions may include any of the processes described herein.

Before providing an example of a beam selection process by UT 12, an example dataset which is stored in memory 32 of UT 12 will be described. As discussed briefly above, this dataset is used by the UT 12 when it conducts a beam selection process. A non-limiting example of the dataset follows (see Table I). The dataset comprises a plurality of elements, wherein each element is associated with one of the unique predetermined terrestrial locations (e.g., shown in FIG. 3), wherein each element further comprises other information relevant to the UT 12 determining beam selection. As will be apparent from the description below, when the processor(s) 30 executes instructions 34, processor(s) 30 also may parse the dataset to determine which beam to select and to carry out any other suitable aspect of the process. From time to time, the dataset may be updated via a downlink from the base station 16 or other tethered or wireless connection.

With regard to the plurality of elements, each element may comprise an element index (e.g., a unique identifier of the element), a set of location identifiers (which may correlate a terrestrial position with that of a particular satellite), and one or more tuples. In the example that follows, each set of location identifiers comprises a first location parameter and a second location parameter. For example, the first and second location parameters may define a unique vector value (in a spherical coordinate system) that points from the predetermined terrestrial location to a celestial position of the satellite 14—e.g., an azimuth value and an elevation value. The azimuth value may be a reference direction (e.g., a degree value on the horizon), wherein the elevation value may be a reference altitude (e.g., a degree value above the horizon), wherein each azimuth or elevation value may be in a floating-point double-precision format (e.g., 64 bits). To illustrate, the set of location identifiers of terrestrial location 50(1) may be $50(1)_{AZ}$, $50(1)_{EL}$. And other terrestrial locations may have location identifiers that identify their locations with respect to satellite 14.

Each tuple in the respective element may be defined as a finite list of parameters pertaining to a satellite beam associated with the particular unique predetermined terrestrial location. According to one non-limiting example, the tuple may comprise a beam identifier parameter, a signal quality factor (SQF) parameter, and an availability (Avail) parameter. The beam identifier parameter identifies the specific beam for the tuple from satellite 14 (e.g., this may be a 16-bit or greater integer). The SQF parameter may define an outroute signal quality measurable by the UT 12 (e.g., this may be a decimal or percentage (e.g., a decimal*100)). And the Avail parameter may be a connectivity parameter that accounts for local weather (at the respective terrestrial location), a strength of the signal gain, a signal frequency, etc. and may be a decimal or percentage (e.g., a decimal*100).

In some examples, a tuple further may comprise at least one hardware parameter identifying which UT hardware is suitable for connecting to the beam identified by the respective beam identifier parameter. The hardware parameter may identify an antenna size parameter (e.g., 74 centimeters (cm), 90 cm, 98 cm, 120 cm, etc.), a signal power parameter (e.g., radio power of 1 Watt (W), 2 W, 3 W, 5 W, etc.), or both. As will be described in the processes below, the antenna size and signal power parameters may be compared to the respective UT's 12 parameters to determine whether the UT 12 can connect to the beam identified by the corresponding beam identifier parameter.

Table I is merely a small illustrative example of the parameters set forth in a dataset that may be stored in memory 32. As appropriate, each element may have one, two, or more tuples. And the quantity of elements will vary with (and correspond to) the quantity of unique predetermined terrestrial locations for a given footprint. Further, a dataset may comprise elements that correspond to numerous footprints.

TABLE 1

| UT dataset | ELEMENT | element index location identifiers |
|---|---|---|
| | tuple(1) | first location parameter second location parameter |
| | tuple(2) | beam identifier parameter SQF parameter Avail parameter Optional hardware parameter (antenna size parameter, signal power parameter, or both) |
| | . . . tuple(t) | beam identifier parameter SQF parameter Avail parameter Optional hardware parameter (antenna size parameter, signal power parameter, or both) |
| | | beam identifier parameter SQF parameter |

TABLE 1-continued

| UT dataset | ELEMENT | element index location identifiers | |
|---|---|---|---|
| | ELEMENT | element index | Avail parameter Optional hardware parameter (antenna size parameter, signal power parameter, or both) |
| | | ... | ... |
| | ELEMENT | element index | ... |
| | | ... | ... |
| | | ... | ... |

Figure 4:
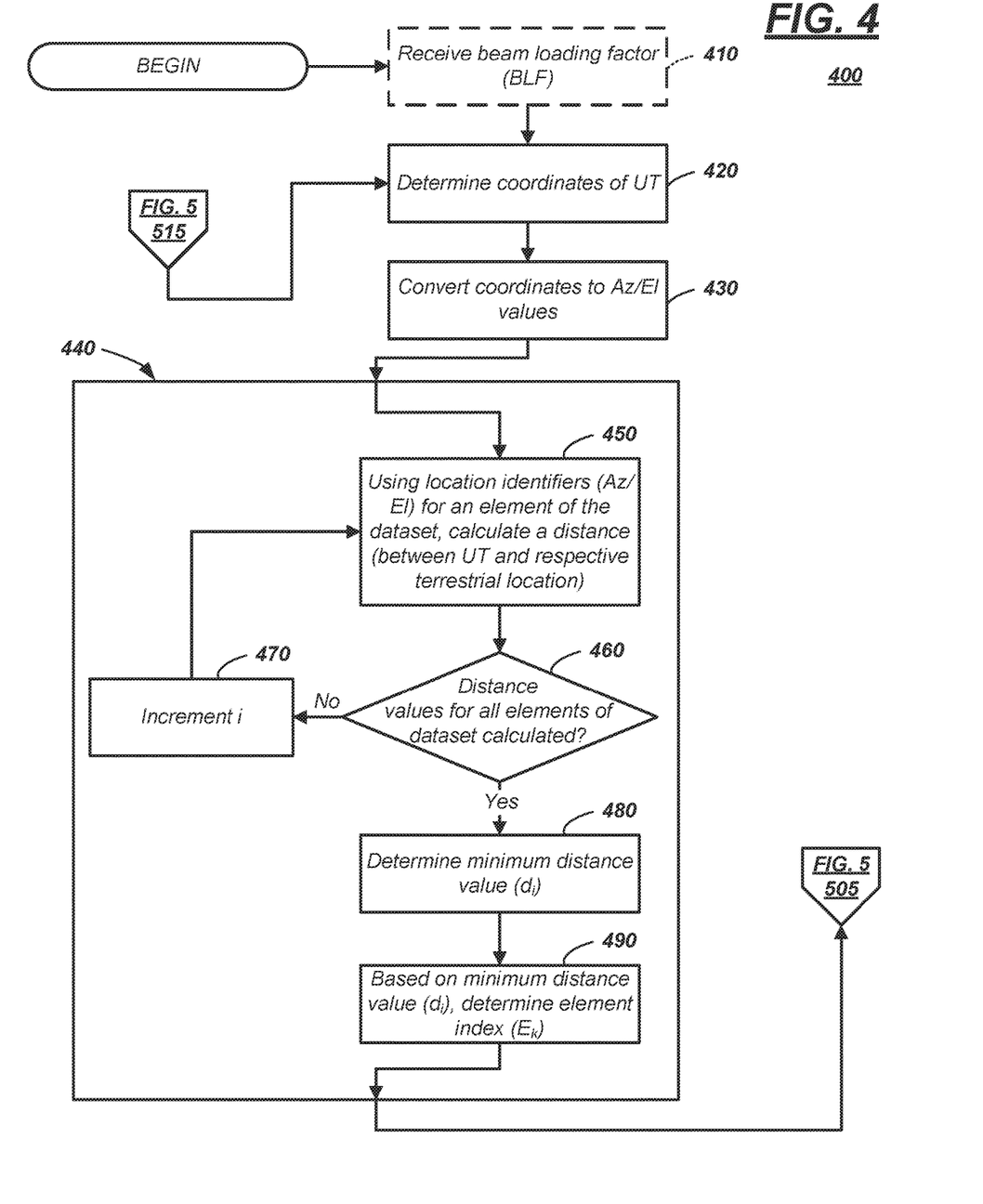
FIG. 4 is a flow diagram illustrating one example of a user terminal process for determining an element associated with a predetermined terrestrial location, wherein determining the element is part of a beam selection process.

Turning now to FIG. 4, a flow diagram is shown that illustrates an example process 400 (carried out by UT 12) for determining an element associated with a unique predetermined terrestrial location. Process 400 may be part of a beam selection process; as explained more below, process 400 may be used with a process 500 (shown in FIG. 5). Process 400 illustrates an example of some of instructions 34 and an arrangement thereof which may be stored in memory 32 and which may be executed using processor(s) 30 of computer 20. Non-limiting examples of software instructions are illustrated as instructional blocks in the diagram. It will be appreciated that while not necessarily explained explicitly in process 400, other software instructions may be carried out as well.

Process 400 may begin at block 410. In block 410, UT 12 optionally may receive one or more beam loading factors (BLFs) from a network gateway. Each BLF received may be associated with a different beam (e.g., UT 12 could receive a BLF for one or more of beams B1-B5). The BLF—which may be controlled by a network operator—may be communicated wirelessly to the UT 12 during installation and stored in memory 32. The processes described herein include examples with and without the UT 12 receiving the one or more BLFs. When no BLF is received for a particular beam, then UT 12 will set the value of BLF to zero (e.g., BLF=0). Block 410 may be received and/or updated at any suitable time during the process 400 (and/or 500).

Block 420 may follow. In block 420, UT 12 may determine a pair of GPS coordinates (e.g., a latitude parameter ($UT_{LAT}$) and a longitude parameter ($UT_{LONG}$)) using GPS device 24. While not required, in some examples, the resolution of the parameters is, in decimal degrees, five decimal places. Block 420 also may comprise GPS device 24 providing the coordinates to processor(s) 30.

In block 430 which may follow, processor(s) 30 may covert the pair of coordinates (e.g., $UT_{LAT}$, $UT_{LONG}$) to azimuth and elevation values (e.g., $UT_{AZ}$, $UT_{EL}$), wherein the azimuth value ($UT_{AZ}$) and elevation value ($UT_{EL}$) are with respect to (or relative to) a position of a specific satellite (e.g., satellite 14). Block 430 may use any suitable conversion technique.

Block 440 may follow and may comprise UT 12 determining (e.g., identifying) one of the elements ($E_k$) of the dataset (e.g., of Table I), wherein the determination is based on a closest proximity of UT 12 to one of the unique predetermined terrestrial locations. (E.g., here k may be an index uniquely identifying the respective element). Block 440 may comprise subblocks 450, 460, 470, 480, and 490.

Recall that for each footprint, a finite and determinable quantity of unique predetermined terrestrial locations exist. For example, as discussed above, footprint F1 shown in FIG. 3 comprises 33 terrestrial locations (for instance, in this example, 50(1), 50(2), . . . , 50(n), wherein n=33). In subblock 450, processor(s) 30 may select one of the elements of the dataset, and for that element, processor(s) 30 may calculate a distance $d_i$ between the UT 12 and the corresponding terrestrial location associated with that element. In some examples, the calculation may determine an L2 norm, as shown in Equation (1). In Equation (1), i is an index (e.g., i=1, i=2, i=3, . . . , i=33).

$$d_i = (UT_{AZ} - 50(i)_{AZ})^2 + (UT_{EL} - 50(i)_{EL})^2 \qquad \text{Equation (1)}$$

In subblock 460 which follows, processor(s) 30 may determine whether distance values ($d_i$) for each of the elements associated with the respective footprint have been calculated. For instance, continuing with the same example, UT 12 determines whether $d_i$ has been calculated for each of the 33 elements of footprint F1. When all distance calculations have been calculated, then process 400 proceeds to subblock 480; otherwise, process 400 proceeds to subblock 470.

In subblock 470, the value of i may be incremented. E.g., i=i+1. Thereafter, the process may loop back and repeat subblock 450. Subblocks 450, 460, 470 may continue to loop until all of the first and second location parameters of the elements associated with the respective footprint (e.g., F1) have been evaluated.

In subblock 480, using each of the calculated distances ($d_i$) for all i (e.g., 1→n), processor(s) 30 may determine which value of $d_i$ is the smallest. E.g., determine MIN($d_i$). Accordingly, subblock 480 represents processor(s) 30 determining which of the unique predetermined terrestrial locations UT 12 is closest.

Figure 5:
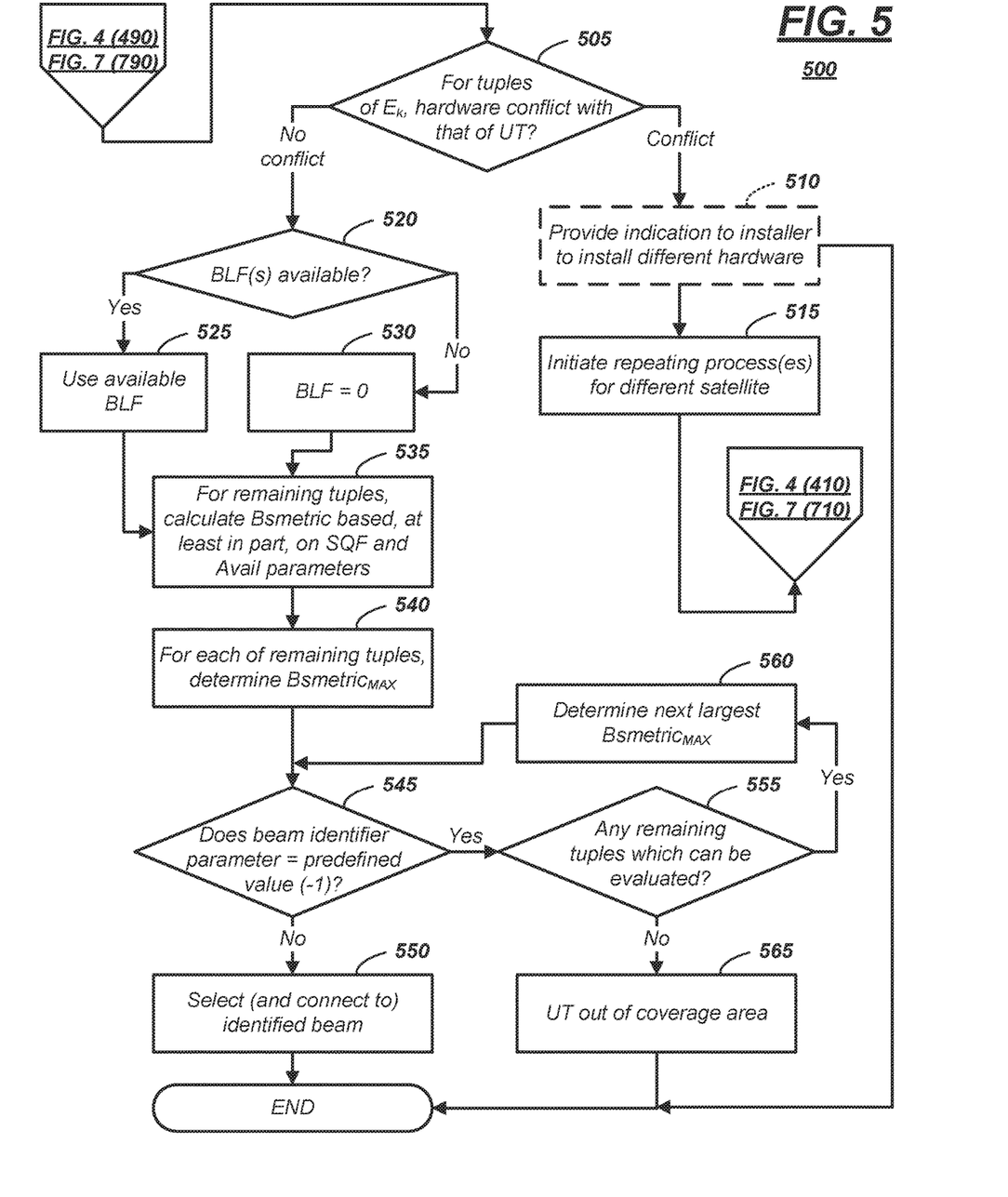
FIG. 5 is a flow diagram illustrating a user terminal process of evaluating which satellite beam to select based on the element determined in the process shown in FIG. 4 (or alternatively determined in the process shown in FIG. 7).

Thus, in subblock 490 which follows, UT 12 determines (e.g., identifies) the element ($E_k$). For example, the identified element ($E_k$) is the element having location identifiers which are determined in subblock 480 to be nearest to UT 12. Following subblock 490, a block 505 of process 500 may follow.

Turning now to FIG. 5, a flow diagram is shown that illustrates an example process 500 (carried out by UT 12) for selecting a satellite beam with which to connect and use based on the determination of element ($E_k$). Process 500 also may be a portion of a beam selection process; as explained above, process 500 may be used with process 400 (FIG. 4). Process 500 illustrates an example of some of instructions 34 and an arrangement thereof which may be stored in memory 32 and which may be executed using processor(s) 30 of computer 20. Non-limiting examples of software instructions are illustrated as instructional blocks in the diagram. It will be appreciated that while not necessarily explained explicitly in process 500, other software instructions may be carried out as well.

In process 500, each of the instructional blocks pertain to the identified element ($E_k$). Process 500 may begin with block 505. In block 505, processor(s) 30 may evaluate the hardware parameters of the tuple(s) associated with the identified element ($E_k$) and determine whether a hardware conflict exists. Recall: the identified element ($E_k$) may have one or more tuples, and each of the tuples(j) may or may not have hardware parameters listed in the dataset. (E.g., for the identified element ($E_k$), there may be a quantity of t tuples, wherein j is an index, wherein each of the tuples can be identified as tuples(j) for j: 1→t.) Thus, in block 505, a conflict exists when—for all of the available tuples(j) of the identified element ($E_k$)—hardware parameters are listed for each of the tuples(j) and each of the listed hardware parameters do not match those of the instant UT 12. For example, for each of the available tuples(j), an antenna size parameter, a signal power parameter, or the like is not compatible with using UT 12. Alternatively, no conflict is determined to exist in block 505 when—for at least one of the tuples(j) of the identified element ($E_k$)—hardware parameters are listed and those hardware parameters are compatible with UT 12, or when hardware parameters are not listed for a respective tuple(j) (e.g., hardware parameter is blank). When a conflict exists, the process 500 may proceed to block 510. When no conflict exists, the process proceeds to block 520, and only the tuples(j) which do not have a conflict are further evaluated during process 500 (e.g., referred to below as the 'remaining tuples(j).').

Block 510 is optional. For example, in some instances, the process 500 is carried out while an installer is installing UT 12 is a residence or commercial facility. In such examples, block 510 comprises processor(s) 30 providing an indication to the installer to install different UT hardware (e.g., that is compatible with an antenna size parameter, a signal power parameter, or the like of a respective beam). This may include the installer receiving an SMS, an email, or notification via the UT 12, or the like. Thereafter, block 505 could be repeated. In another example, process 500 ends following block 510. In other examples, process 500 proceeds to block 515.

In block 515, processor(s) 30 initiates repeating processes 400 and 500 for a different satellite (e.g., to satellite 15). FIG. 5 illustrates block 410 of FIG. 4 following block 515. This, of course, is merely an example.

In block 520 which may follow block 505, processor(s) 30 determine whether BLF(s) are available for the beam(s) associated with the remaining tuples(j) of the identified element ($E_k$)—i.e., the beam identified by the respective beam identifier parameters (beam_id(j)).

In block 525 which follows block 520, for each of the remaining tuples(j) having an available BLF, the available value is assigned to BLF(j). And in block 530 which also follows block 520, for each of the remaining tuples(j) having to available BLF, BLF(j)=0.

Block 535 follows both of blocks 525 and 530. In block 535, for each the remaining tuples(j), processor(s) 30 may calculate a metric (e.g., Bsmetric(j)) based, at least in part, on the SQF parameter (e.g., SQF(j)) and the Avail parameter (e.g., Avail(j)). Equation (2) illustrates one non-limiting example.

$$Bsmetric(j)=(1-BLF(j))*SQF(j)*Avail(j) \quad \text{Equation (2).}$$

Recall that each of SQF(j) and Avail(j) may be values between zero and 100. Further, recall that the dataset may be updated as desirable; thus, while SQF(j) is measured by UT 12, Avail(j) may be updated by the network as appropriate. If perchance no value is available for Avail(j), then a default value may be assigned (e.g., such as 99.5 or any other suitable value).

While not shown in FIG. 3., unique predetermined terrestrial locations of element(s) may exist outside of a footprint. In these instances, in at least some examples, the SQF parameter and/or Avail parameter may have values less than a first predetermined threshold and less than a second predetermined threshold, respectively. In this manner, the value of the Bsmetric(j) will be undesirably low when evaluated in block 540 which follows.

Block 540 follows block 535. In block 540, processor(s) 30 may determine $Bsmetric_{MAX}$. That is, processor(s) 30 may determine which of the values of Bsmetric(j) is largest.

In block 545 which follows, processor(s) 30 may determine whether the beam identifier beam_id(j) that corresponds with the Bsmetric(j) has a predefined value that identifies it as out of (or outside of) satellite coverage. According to one example, a negative one (−1) is assigned to tuples(j) when the corresponding predetermined terrestrial location is out of coverage of the respective beam (e.g., outside of beam B1). In this manner, terrestrial locations slightly outside of the respective footprint can be used to assist the UT 12 in determining its location with respect to a satellite beam. (Note: such predetermined terrestrial locations are contemplated even though they are not shown in FIG. 3.) When the value of the beam identifier parameter beam_id(j) is not the predefined value, then process 500 proceeds to block 550. Else, the process 500 proceeds to block 555.

In block 550 which may follow block 545, processor(s) 30 determine (e.g., select) the respective beam identified by the beam identifier parameter beam_id(j). Block 550 further may comprise connecting to this beam. Thereafter, the process may end.

In block 555 which may follow block 545, processor(s) 30 may determine whether there are any remaining tuples(j) which have not been evaluated by block 545. If so, process 500 may proceed to block 560; else, process 500 may proceed to block 565.

In block 560 which may follow block 555, the next largest Bsmetric(j) may be determined. Thereafter, the process 500 proceeds to block 545 again (and repeats as previously described). This may be carried out provided there are remaining tuples(j) which have yet to be evaluated by block 545. Block 560 is optional; thus, in some examples, block 545 may proceed to block 565 without executing block 560.

In block 565 which may follow block 555, processor(s) 30 determine that the UT 12 is outside of a satellite coverage area (e.g., outside of any of the footprints of the respective satellite 14). In this instance, process 500 may end, or alternatively may loop back to block 410 (process 400) evaluating a different satellite (e.g., satellite 15).

Other UT beam selection examples exist. Per FIG. 4, subset 54 of the unique predetermined terrestrial locations were used by UT 12 to select a satellite beam. In at least one example, subset 58 (also shown in FIG. 4) may be used by UT 12 to determine how far UT 12 is from perimeter 56 or another footprint (e.g., such as footprint F2 or F5).

Other examples of process 500 also exist. According to one non-limiting example, following block 565, the process loops back to block 515 instead (e.g., and initiates repeating the processes for different satellites). Or according to another non-limiting example, each of processes 400 and 700 are executed for multiple satellites; in this manner, in process 500, a respective beam may be selected from the beams of a number of different satellites—thereby providing more choices for UT 12 in selecting a desirable beam.

Figure 6:
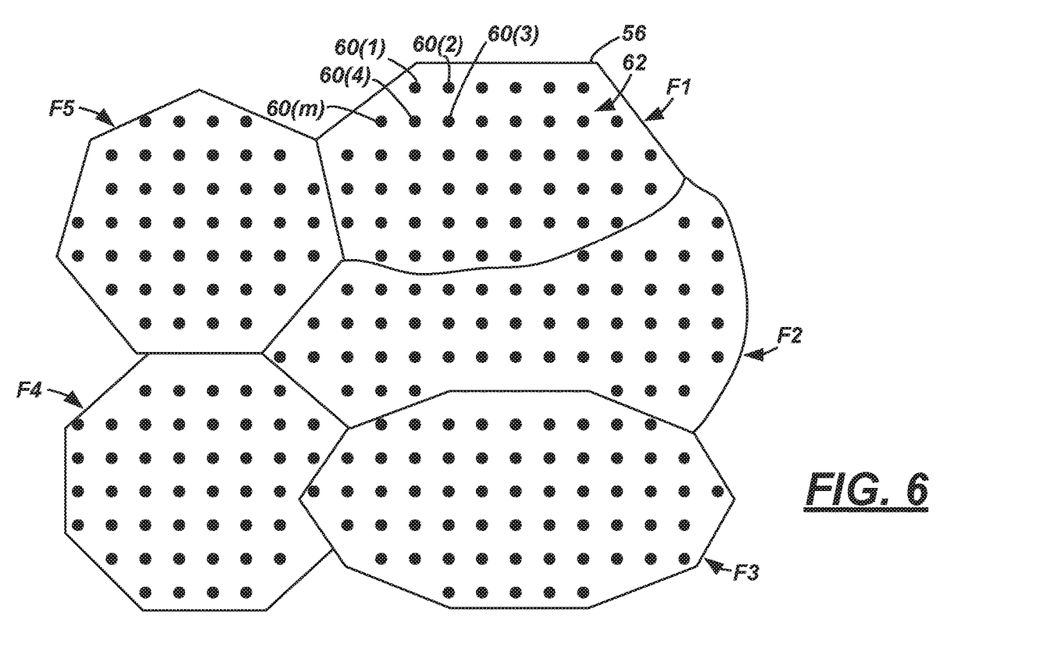
FIG. 6 is another diagram illustrating the satellite view of the footprints shown in FIG. 2 and further illustrating additional unique sets of predetermined terrestrial locations may correspond with and/or define each footprint.
Figure 7:
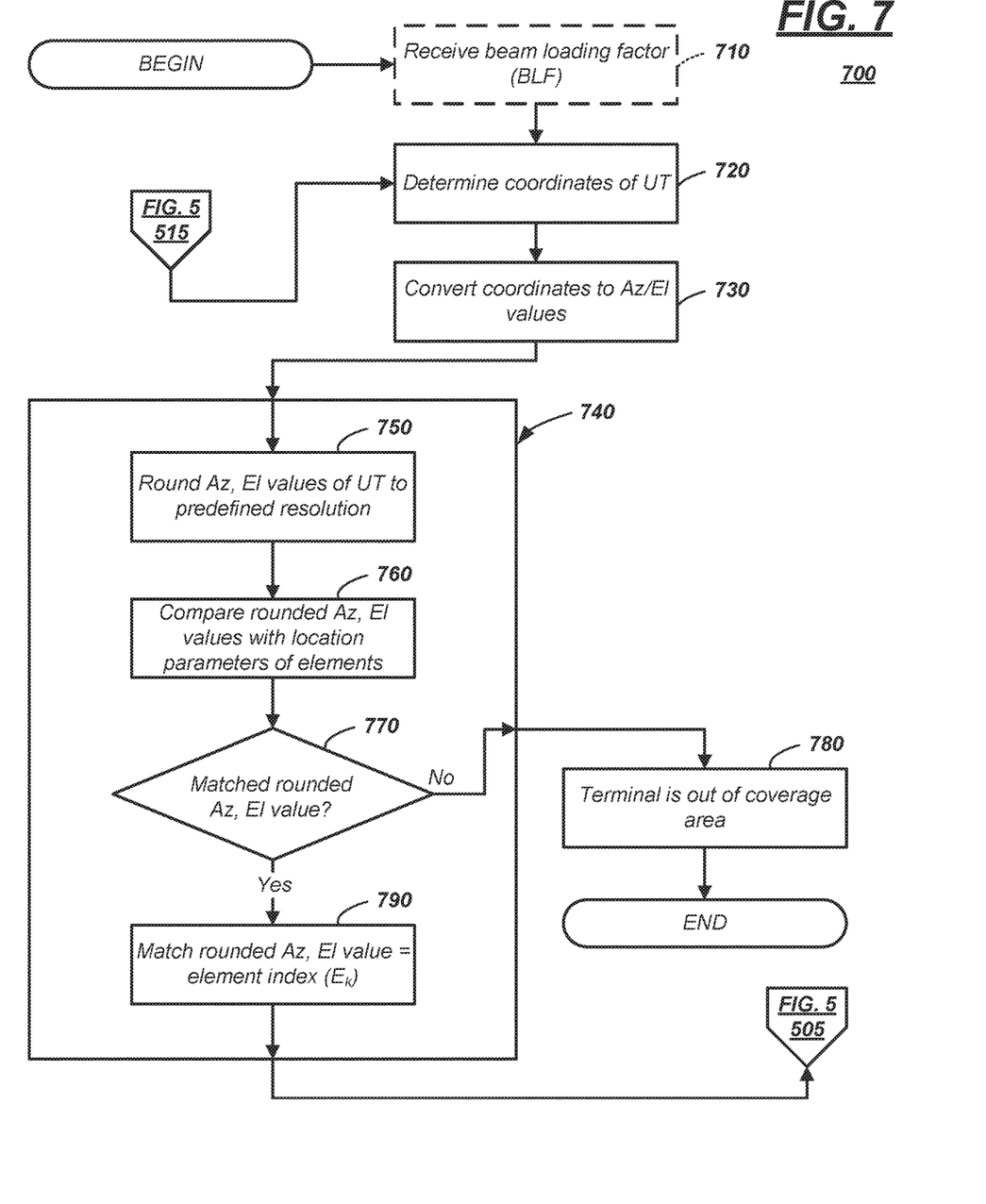
FIG. 7 is a flow diagram illustrating another example of a user terminal process for determining an element associated with a predetermined terrestrial location, wherein determining the element is part of a beam selection process.

According to yet another example, UT 12 may determine beam selection according to the examples shown in FIGS. 6-7. FIG. 6 illustrates another example of footprints F1-F5, wherein a plurality of unique predetermined terrestrial locations 60(1), 60(2), 60(3), 60(4), and 60(m) are shown within footprint F1 by way of example (e.g., a set 62), wherein m represents a quantity of terrestrial locations (e.g., here, m equals a total of 48 terrestrial locations (within footprint F1) by way of example only). Index i may be used here similarly to that described above (e.g., i=1, i=2, i=3, . . . , i=48). In FIG. 6, it will be appreciated that the unique predetermined terrestrial locations may be arranged as a grid or other suitable spaced-arrangement. In at least one example, the respective location identifiers of the plurality of elements define a grid of equidistantly-spaced locations within the satellite beam. While some terrestrial locations may define perimeter 56, additional terrestrial locations may exist within terrestrial locations about the perimeter 56. According to at least one example, any single unique predetermined terrestrial location is no more than a threshold distance from another of the plurality of unique predetermined terrestrial locations. In this manner, a process 700 shown in FIG. 7 may be effectively executed. Other aspects of the beam, footprint, and associated dataset may be similar to that described above.

Turning now to FIG. 7, a flow diagram is shown that illustrates the example process 700 (carried out by UT 12) for determining the element ($E_k$) associated with a unique predetermined terrestrial location—e.g., process 700 may in some instances be used in place of process 400, wherein the plurality of predetermined terrestrial locations is arranged similarly to that shown in FIG. 6. Thus, process 700 may be part of a beam selection process and may be used with process 500 (shown in FIG. 5). Process 700 illustrates an example of some of instructions 34 and an arrangement thereof which may be stored in memory 32 and which may be executed using processor(s) 30 of computer 20. Non-limiting examples of software instructions are illustrated as instructional blocks in the diagram. It will be appreciated that while not necessarily explained explicitly in process 700, other software instructions may be carried out as well.

Process 700 may begin with block 710 followed by block 720 followed by block 730. According to at least one example, blocks 710, 720, 730 may be similar or identical to blocks 410, 420, 430, respectively; therefore, for sake of brevity, these blocks will not be re-described here. Block 740 may follow block 730.

Block 740 may comprise subblocks 750, 760, 770, and 790. In subblock 750, using azimuth and elevation values (e.g., $UT_{AZ}$, $UT_{EL}$) determined in block 730, processor(s) 30 may calculate a rounding of the azimuth and elevation values (e.g., $UT_{AZ\_RD}$, $UT_{EL\_RD}$). The rounding may be in accordance with a predefined resolution, wherein the predefined resolution may correspond to a spacing of the unique predetermined terrestrial locations from one another in a respective footprint and/or may correspond to a location of the respective satellite relative to the beam footprint. According to one example, a network operator controls the predefined resolution and provides it to the UT 12. Further, according to another example which may be used in combination with the examples set forth above, when no predefined resolution is provided for a given region (or footprint), then UT 12 may use a default resolution of (0.03, 0.03). For example, the rounded azimuth and elevation values ($UT_{AZ\_RD}$, $UT_{EL\_RD}$) may be rounded to the nearest 0.03 in azimuth and nearest 0.03 in elevation. Of course, these values are merely examples. Further, the value of a default azimuth resolution need not be the same as a default elevation resolution.

In subblock 760 which follows, processor(s) 30 compare the rounded azimuth and elevation values to the location parameters of each of the unique predetermined terrestrial locations in the respective footprint (e.g., F1)—seeking a match.

In subblock 770 which may follow, processor(s) 30 may determine whether a match is determined. E.g., processor(s) 30 may determine a match when the rounded azimuth and elevation values ($UT_{AZ\_RD}$, $UT_{EL\_RD}$) match one of the first or second location parameters of the elements, even though additional decimal places of the first or second location parameters do not match. Continuing with the default resolution example above (of 0.03, 0.03), if $UT_{AZ\_RD}$, $UT_{EL\_RD}$ equaled 10.36, 14.03 and a pair of first and second parameters equaled 10.3634, 14.0343, then processor(s) 30 would determine a match in subblock 770 (despite the difference of 0.0034 and 0.0043, respectively, as these errors are smaller than the level of resolution). When each of the first and second location parameters of each of the elements associated with the respective footprint are compared and no match with the rounded azimuth and elevation values ($UT_{AZ\_RD}$, $UT_{EL\_RD}$) is determined, then process 700 proceeds to block 780; alternatively, when a match is determined, then process 700 proceeds to subblock 790.

In block 780, processor(s) 30 determine that the UT 12 is outside of a satellite coverage area (e.g., similar to block 565). Thereafter, process 700 may end.

In subblock 790, UT 12—via processor(s) 30—determines (e.g., identifies) the element ($E_k$). For example, the identified element ($E_k$) is the element having location identifiers which are determined to be nearest to UT 12. Following subblock 790, process 500 may follow (e.g., proceeding to block 505 (FIG. 5), which was previously described). In this manner, having identified element ($E_k$), UT 12 utilize the remainder of the dataset to determine (e.g., select) a suitable beam with which to connect. As process 500 has been previously described, this will not be re-described here.

Still other examples exist. According to at least one example, any or all of the processes 400, 500, and/or 700 are executed by the satellite base station 16. According to another example, any or all of the processes 400, 500, and/or 700 are executed by the land-based server 42.

Thus, there has been described a satellite communication system comprising user terminals (UTs), one or more satellites, and one or more base stations. A plurality of user terminals store a dataset in their respective computing memories and ultimately use the dataset to determine with which beam of a satellite to connect. Within a footprint of a satellite beam are a plurality of unique predetermined terrestrial locations relatively near an example UT (provided the UT is in a region of satellite coverage). The example UT determines which of the terrestrial locations it is nearest. Once this is determined, the example UT evaluates parameters in the dataset, and based on this evaluation, the example UT determines with which of the satellite beams to connect.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a satellite user terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of determining one of a plurality of satellite beams, comprising:

storing, at a user terminal (UT), a dataset that comprises a plurality of telecommunication network elements including respective predetermined location identifiers for each of the elements that specify respective unique predetermined terrestrial locations for each of the elements, wherein the respective predetermined terrestrial locations of at least some of the elements are used to specify a first boundary of a first footprint of a first satellite beam, wherein the first footprint is within an area defined by an intersection of the first satellite beam with a ground surface;

using the dataset, determining an element ($E_k$) from among the plurality of elements based on a proximity of the UT to the respective unique, predetermined terrestrial location of the element ($E_k$); and then determining one of the plurality of satellite beams with which to utilize satellite communication;

tailoring the first footprint by determining a second footprint of the first satellite beam that is within the first footprint of the first satellite beam, wherein the respective location identifiers of at least some other of the plurality of elements are indicia of a second boundary of the second footprint of the first satellite beam, and wherein the second footprint is smaller than the first footprint.

2. The method of claim 1, wherein each of the plurality of elements comprises: an element index, location identifiers of a respective unique and predetermined terrestrial location relative to a satellite, and one or more tuples, wherein each of the one or more tuples comprise: a beam identifier associated with one of the plurality of satellite beams and at least one of a signal quality parameter (SQF) or an availability parameter (Avail) of the respective one of the plurality of satellite beams.

3. The method of claim 2, wherein determining the one of the plurality of satellite beams further comprises using the corresponding one or more tuples of the element ($E_k$).

4. A method of determining one of a plurality of satellite beams, comprising:
storing, at a user terminal (UT), a dataset that comprises a plurality of telecommunication network elements including respective predetermined location identifiers for each of the elements that specify respective, unique predetermined terrestrial locations for each of the elements, wherein the respective predetermined terrestrial locations of at least some of the elements are used to specify a first boundary of a first footprint of a first satellite beam, wherein the first footprint is within an area defined by an intersection of the first satellite beam with a ground surface, wherein each of the plurality of elements further comprises: an element index, location identifiers of a respective unique and predetermined terrestrial location relative to a first satellite, and one or more tuples, wherein each of the one or more tuples comprise: a beam identifier associated with one of the plurality of satellite beams and at least one of a signal quality parameter (SQF) or an availability parameter (Avail) of the respective one of the plurality of satellite beams;
using the respective location identifiers of the plurality of elements, determining an element ($E_k$) from among the plurality of elements based on a proximity of the UT to the respective unique, predetermined terrestrial location of the element ($E_k$); and
using the corresponding one or more tuples of the element ($E_k$), determining one of the plurality of satellite beams with which to utilize satellite communication;
tailoring the first footprint by determining a second footprint of the first satellite beam that is within the first footprint of the first satellite beam, wherein the respective location identifiers of at least some other of the plurality of elements are indicia of a second boundary of the second footprint of the first satellite beam, and wherein the second footprint is smaller than the first footprint.

5. The method of claim 4, further comprising establishing a satellite connection with the determined one of the plurality of satellite beams.

6. The method of claim 4, wherein, for each of the plurality of elements, the respective location identifiers comprise a first location parameter and a second location parameter, wherein—for each respective element—the corresponding first and second location parameters define a unique predetermined terrestrial location relative to a celestial position of the first satellite.

7. The method of claim 4, wherein at least some of the one or more tuples comprise both the signal quality parameter and the availability parameter.

8. The method of claim 7, wherein the at least some of the one or more tuples further comprise at least one hardware parameter, wherein the at least one hardware parameter is used to determine the one of the plurality of satellite beams with which to utilize satellite communication.

9. The method of claim 8, wherein the at least one hardware parameter comprises an antenna size parameter and a signal power parameter for the UT to establish and utilize satellite communication.

10. The method of claim 4, wherein at least some of the plurality of elements comprises multiple tuples.

11. The method of claim 4, wherein the respective location identifiers of at least some of the plurality of elements are located outside of the first and second boundaries.

12. The method of claim 11, wherein, when the location identifiers of the respective element are located outside of the first and second boundaries, then the beam identifier of the respective element is a negative value, the signal quality parameter being less than a first predetermined threshold, the availability parameter being less than a second predetermined threshold, or a combination thereof.

13. The method of claim 4, wherein one of the first boundary or the second boundary, or both, have an irregular shape, wherein irregular shape refers a noncircular, nonelliptical, or nonregular shape, wherein irregular shape refers to an asymmetrical area having at least one portion of a perimeter that does not mirror another region of the perimeter and that is not uniform with respect to any other portion of the perimeter.

14. The method of claim 4, wherein the respective location identifiers of the plurality of elements define a grid of equidistantly-spaced locations within the first satellite beam.

15. The method of claim 4, wherein determining the element ($E_k$) using the respective location identifiers further comprises: determining a latitude value and a longitude value of the UT; converting the latitude and longitude values of the UT into an azimuth value and an elevation value that correspond with a celestial position of the first satellite; and calculating a distance value using the azimuth and elevation values (of the UT) and the location identifiers of the element ($E_k$).

16. The method of claim 15, wherein determining the relative position comprises: calculating a plurality of distance values between the UT and at least some of the plurality of evaluation points; and then, determining which of the plurality of distance values is a minimum.

17. The method of claim 4, wherein determining the element ($E_k$) using the respective location identifiers further comprises: determining a latitude value and a longitude value of the UT; converting the latitude and longitude values of the UT into an azimuth value and an elevation value that correspond with a celestial position of the first satellite; rounding the azimuth and elevation values according to a predetermined resolution; and then comparing the rounded azimuth and elevation values to each of the respective location identifiers of the plurality of elements.

18. A computer, comprising:
one or more processors; and
memory communicatively coupled to the one or more processors, wherein the memory stores instructions executable by the one or more processors, wherein the instructions comprise to:
store a dataset that comprises a plurality of telecommunication network elements including respective predetermined location identifiers for each of the elements that specify respective unique predetermined terrestrial location for each of the elements, wherein the respective predetermined terrestrial locations of at least some of the elements are used to specify a first boundary of a first footprint of a first satellite beam, wherein the first footprint is within an area defined by an intersection of the first satellite beam with a ground surface;

using the dataset, determine an element ($E_k$) from among the plurality of elements based on a proximity of the UT to the respective unique, predetermined terrestrial location of the element ($E_k$); and then select one of the plurality of satellite beams with which to utilize satellite communication, wherein the computer is a user terminal, a satellite base station, or a land-based server;

wherein the respective location identifiers of at least some other of the plurality of elements are indicia of a second boundary of a second footprint of the first satellite beam, and wherein the second footprint of the first satellite beam is within the first footprint of the first satellite beam and the second footprint is smaller than the first footprint.

19. The computer of claim 18, wherein the specified boundary has an irregular shape including an asymmetrical area having at least one portion of a perimeter that does not mirror another region of the perimeter and that is not uniform with respect to any other portion of the perimeter.

* * * * *

UNITED STATES PATENT AND TRADEMARK OFFICE
CERTIFICATE OF CORRECTION

PATENT NO. : 11,711,137 B2
APPLICATION NO. : 16/728260
DATED : July 25, 2023
INVENTOR(S) : Murali Regunathan and David A. Roos Page 1 of 1

It is certified that error appears in the above-identified patent and that said Letters Patent is hereby corrected as shown below:

On the Title Page

In the Abstract:
Item (57), in Lines 1-2, replace "user terminal disclosed." with -- user terminal is disclosed. --.

In the Claims

Column 18, in Line 24, replace "refers a noncircular," with -- refers to a noncircular --.

Signed and Sealed this
Twenty-sixth Day of December, 2023

Katherine Kelly Vidal
*Director of the United States Patent and Trademark Office*